United States Patent [19]

Neely

[11] Patent Number: 5,422,986
[45] Date of Patent: Jun. 6, 1995

[54] METHOD FOR GENERATING SOFT-EDGE MATTES FOR VISUAL ELEMENTS OF IMAGES

[75] Inventor: Shawn R. Neely, Sunnyvale, Calif.

[73] Assignee: Pacific Data Images, Inc., Sunnyvale, Calif.

[21] Appl. No.: 61,492

[22] Filed: May 12, 1993

[51] Int. Cl.$^6$ .............................................. G06F 15/20
[52] U.S. Cl. ........................................................ 395/126
[58] Field of Search ............... 395/141, 142, 143, 126, 395/155, 161; 345/121, 133, 136

[56] References Cited

U.S. PATENT DOCUMENTS

5,170,440 12/1992 Cox ........................................ 382/22
5,179,641 1/1993 Comins et al. ...................... 395/132
5,220,650 6/1993 Barkans ............................... 395/163
5,251,160 10/1993 Rockwood et al. ................ 364/578

Primary Examiner—Phu K. Nguyen
Attorney, Agent, or Firm—Fernwick & West

[57] ABSTRACT

Method and apparatus are disclosed for generating mattes of film, video, or other visual image elements, in which the operator may specify soft-edge regions for the extended visible fall-off of certain difficult areas such as hair, clouds, shadows, and blurred objects. The elements may be either still or in motion, and automatic interpolation of keyframe regions may be used to simplify the generation of in-between frames to create traveling soft-edge mattes.

22 Claims, 9 Drawing Sheets

000
METHOD FOR GENERATING SOFT-EDGE MATTES FOR VISUAL ELEMENTS OF IMAGES

FIELD OF INVENTION

This invention relates to method and apparatus for processing images, and more particularly to techniques for providing composite images having smooth outline edges in the visual elements of the image.

BACKGROUND OF THE INVENTION

A common special effect in film and television production is the composition of a foreground visual element (an actor, for example) over a different background to produce a combined, or composite picture. Often this technique is used when it is impractical to have all subjects in the scene during shooting, for safety or economic reasons, or when some of the elements are actually miniature models.

Sometimes it is possible to film the foreground subject in front of a controlled special background color, in which case other schemes for electronically combining foreground and background images are known (see, for example, U.S. Pat. No. 4,100,569). Since precise control of the foreground environment is not always possible or practical, rotoscoping techniques are often used to generate the outline of the foreground element. The rotoscoping technique typically involves the display of the original picture containing the subject, and allows the operator to draw or otherwise construct a close outline around the visual elements. These regions are then filled using some appropriate technique to generate matte elements. Depending upon the requirements of the subsequent process, the regions may be filled either inside or outside to create either a matte which is black where the foreground element is, and clear everywhere else (a "positive", "male", or "clear-core" matte), or a matte which is clear where the foreground element is and black everywhere else (a "negative", "female", or "black-core" matte).

This technique historically has been carried out using paint on film, and modern manifestations of this same technique often use computers with graphics displays to show the foreground picture and permit the operator to create the outline. With computers, digital representations corresponding to the inside and outside of the outline may be created (and the actual colors may be arbitrary). Intermediate values may be used to specify anti-aliased pixels along the outline edges to give the illusion of a smooth outline. Furthermore, by using the computer for rotoscoping a sequence of frames, the operator may be able to specify outlines for only certain keyframes, and the computer can generate the outlines and mattes for the in-between frames automatically.

One of the deficiencies of the prior technique is that it does not work well for certain types of visual elements which do not have a distinct boundary. Semi-transparent edges occurring in hair, clouds, or blurred objects in motion or out of focus are particularly difficult. Other visual elements which exhibit soft edges, such as shadows, present similar difficulties for matte extraction by prior rotoscoping methods. One method which attempts to overcome the problems presented by the soft-edge areas is general blurring of the matte. A hard-edge matte is first constructed and then blurred using image-processing or optical methods to create a matte with a soft edge. The problem with this technique, however, is that the element usually requires different degrees of softness along its outline, and general blurring of a hard-edge matte cannot simply meet this requirement. It is therefore desirable to overcome the shortcomings of prior matte extraction techniques by providing control for generating soft-edge mattes.

SUMMARY OF THE INVENTION

In accordance with the present invention, methods and apparatus are provided to generate soft-edge mattes. Prior art techniques typically embody a digital computer with graphics display to show the digitized film or video frame, to allow the operator to specify the outline of the foreground element by manipulating some graphical pointing device such as a mouse or tablet stylus, to display the outline together with the foreground frame as a sequence of lines or curves, and to fill in the outline with some appropriate value to render a foreground matte. To give the visual impression of smoothness, the edges of the matte may be computed according to how much the matte covers each pixel, generating intermediate values for the matte. In contrast, however, the present invention provides a technique which also permits the operator to specify portions of the matte which are rendered with an adjustable soft-edge falloff. This is facilitated by using a pair of regions for the rotoscoped element, including the inner region that defines the solid, opaque, interior area of the element, and the outer region that defines the transition area where the matte becomes more transparent. Typically these regions are specified and displayed by outlines, possibly of different colors or other distinguishing visual attributes, although the regions can also be displayed in other manners consistent with the principles of the present invention, such as by tinted or shaded areas. The area between the outlines is typically filled in a gradient manner which can be controlled in various ways to affect the falloff characteristics of the soft-edge regions of the matte. For simplicity and operator efficiency, the pair of outlines may be treated as a single outline for the purposes of interaction with those areas which do not require a soft edge.

DESCRIPTION OF THE PREFERRED EMBODIMENT

Figure 1:
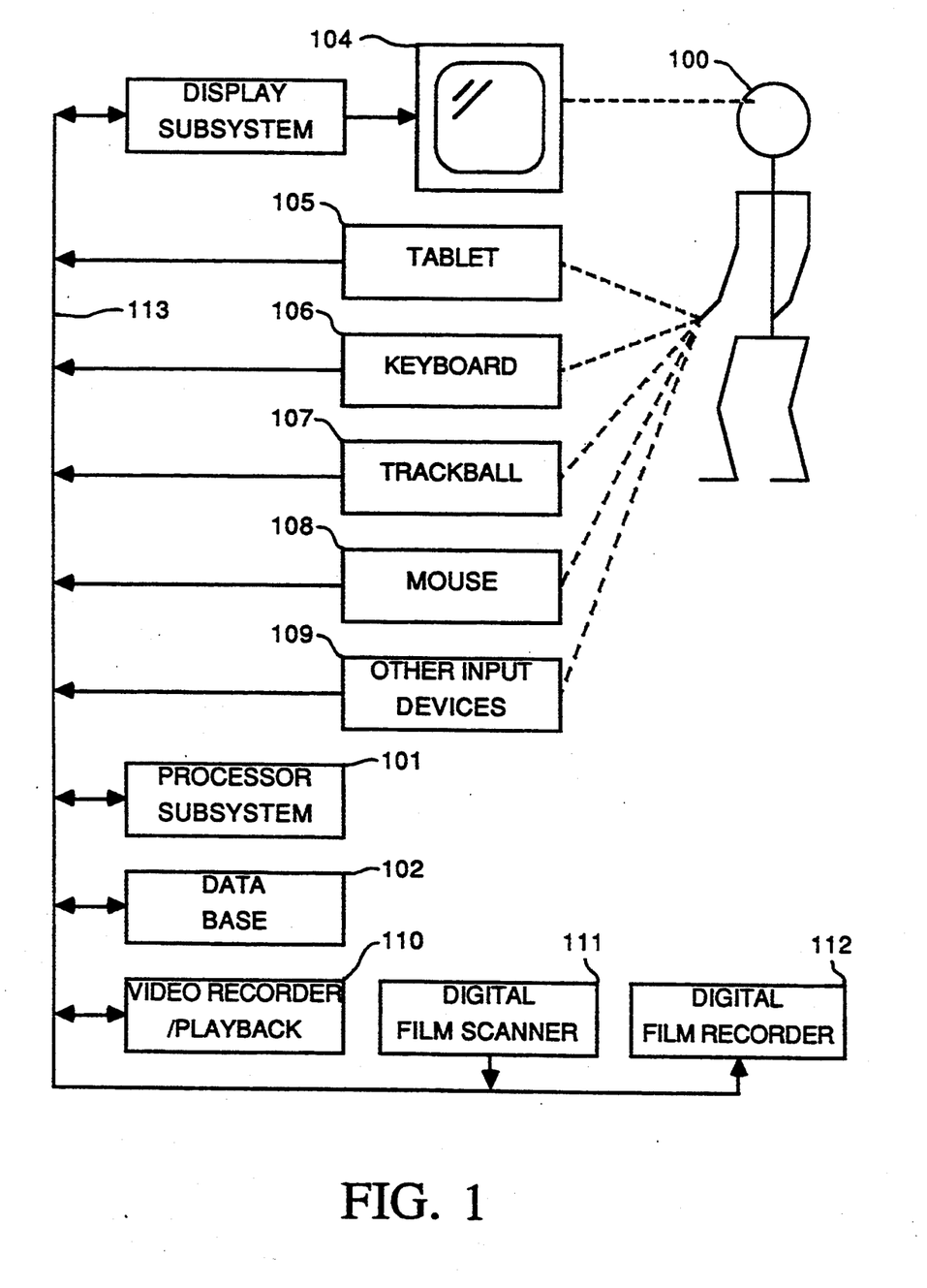
FIG. 1 is a block diagram of an apparatus in accordance with an embodiment of the invention, and which can be used to practice the method of the present invention.

Referring to FIG. 1 there is shown a block diagram of an apparatus in accordance with an embodiment of the present invention, and which can be used to practice the method of the invention. An operator 100 works with input devices 105-109 for specifying matte outlines and for controlling the process for generating soft-edge mattes, and with a display device 104 to monitor input and control of the process. These devices are coupled to processor control circuitry 101 and data base storage 102, implemented in the present embodiment by a conventional general-purpose computer such as a Silicon Graphics work station with graphics display 104, keyboard 106, and mouse 108, tablet 105, or other pointing input devices. Also in the present embodiment, input and output devices 100-112 for scanning pictures into the system data base and for outputting the mattes or foreground elements are optionally provided.

Figure 2:
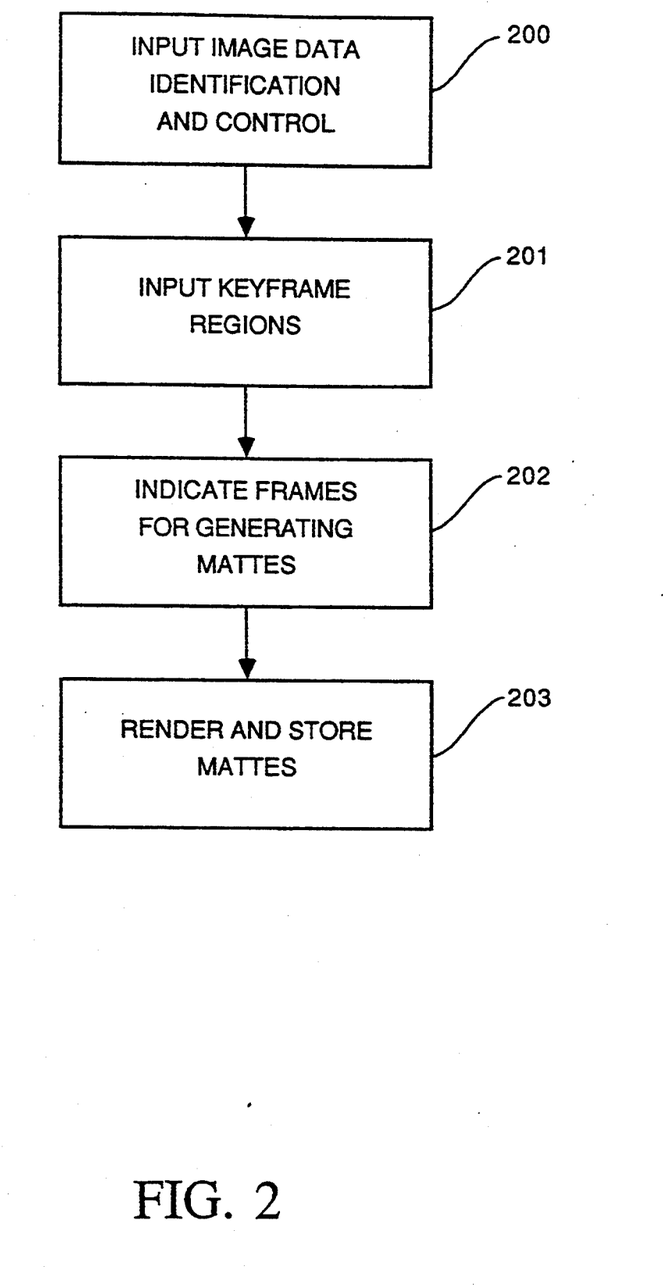
FIG. 2 is a flow diagram for a generalized procedure for generating mattes, and which is used in the preferred embodiment of the present invention.

Referring to FIG. 2 there is shown a generalized flow diagram of a typical procedure for generating mattes in accordance with an embodiment of the invention. The process may rely upon the operator 100 to specify 200 the source of the input images and where the matte output is to be stored. The block 201 represents the input of the keyframe regions, typically performed by the operator through a sequence of steps using the input devices. Of course, alternative embodiments of the invention may employ alternative techniques for identifying the matte regions, such as image-processing techniques for edge detection. Which mattes to generate and in what frames are indicated at 202, and the renderings are stored 203 for subsequent use of the mattes thus generated. It will be understood that variations of this procedure can be employed, consistent with the principles of the invention, depending upon the number and size of the images, the specific types of input and output devices, and upon operator preferences.

Figure 3:
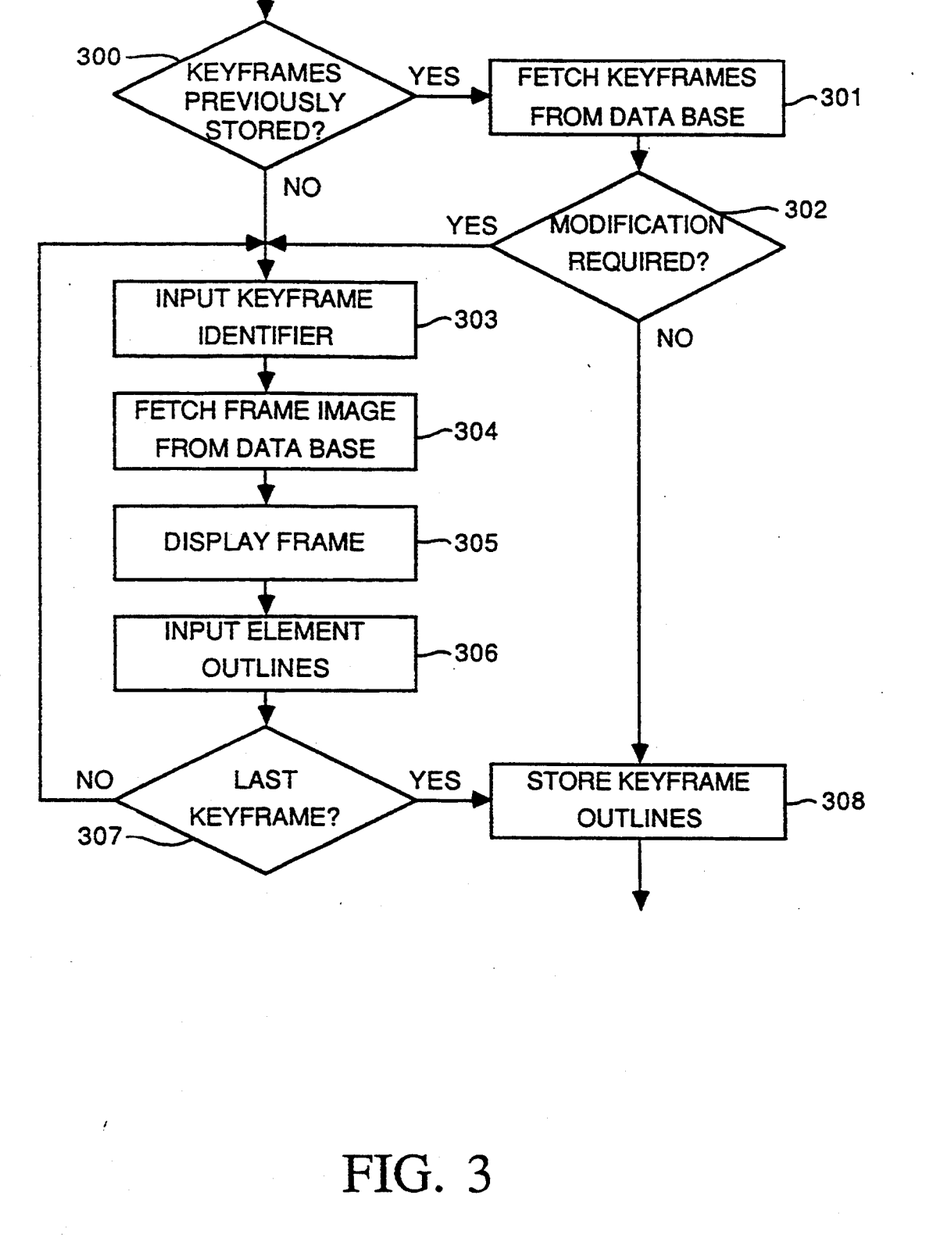
FIG. 3 is a flow diagram of the routine for inputting keyframe outlines.

Referring to FIG. 3 there is shown a flow diagram for a typical routine for inputting the keyframe outlines 201. In the preferred embodiment of the invention, the operator may store the inputs provided and terminate the procedure for resuming at a later time. Decision 300 determines whether this condition exists, in which case the previously-stored keyframes data are retrieved 301 from the data base. Decision 302 determines whether further input is required from the operator. If no more input or modification of input is required, the process proceeds to block 202 of FIG. 2. Otherwise, the process proceeds to step 303 which represents the process by which the operator identifies which keyframe data is to be input or modified. The specified frame data is retrieved 304 from the data base, and is displayed 305. The operator inputs or modifies the matte element outlines 306, as described in more detail below. Decision 307 determines whether all required input has been supplied. If not, the process returns 303 for more input. Once all input has been supplied, the process stores 308 the keyframe matte outlines for subsequent processing.

Figure 4:
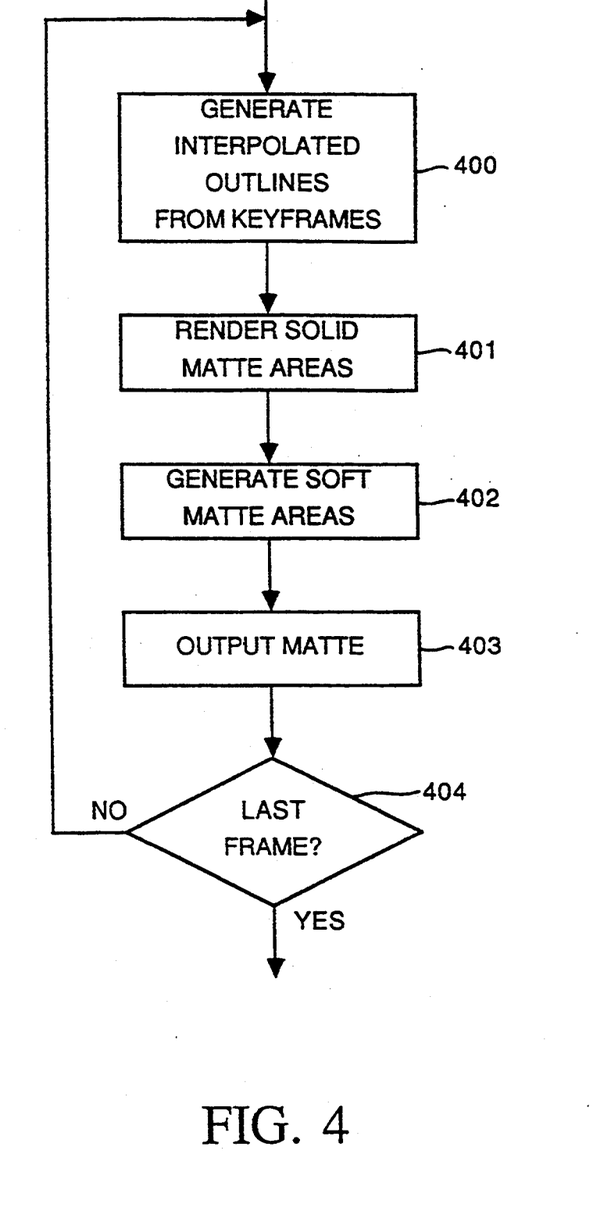
FIG. 4 is a flow diagram of the routine for rendering and outputting matte elements.

Referring now to FIG. 4 there is shown a flow diagram of a routine for rendering and outputting mattes. Matte outlines for the interpolated in-between frames are calculated 400 from the keyframe outlines according to various techniques conventionally known to skilled practitioners of the art. In the present embodiment, a conventional method of cubic piece-wise polynomial spline interpolation is used. The block 401 represents the procedure for rendering the solid mattes areas which will be readily known to skilled practitioners of the art; in the present embodiment the method of approximating the solid matte area with polygons and rendering in an anti-aliased fashion is used. The soft matte regions are then generated 402 in accordance with an embodiment of the invention, as described in more detail below. The procedure outputs the soft-edge matte 403 by storing into the database or recording onto one of the optional output devices or by subsequent image processing. Decision 404 determines whether all required matte frames have been generated, and if not, the process returns to step 400 and another frame is processed. If all soft-edge mattes have been generated 404, the process is complete. It will be understood, however, that variations of this typical routine can be also employed, for example, the soft-edge regions for a frame can be generated before the solid regions are rendered for a frame, or all the solid regions for every frame can be rendered and then all the soft-edge regions for every frame can be generated, as convenient.

Figure 5:
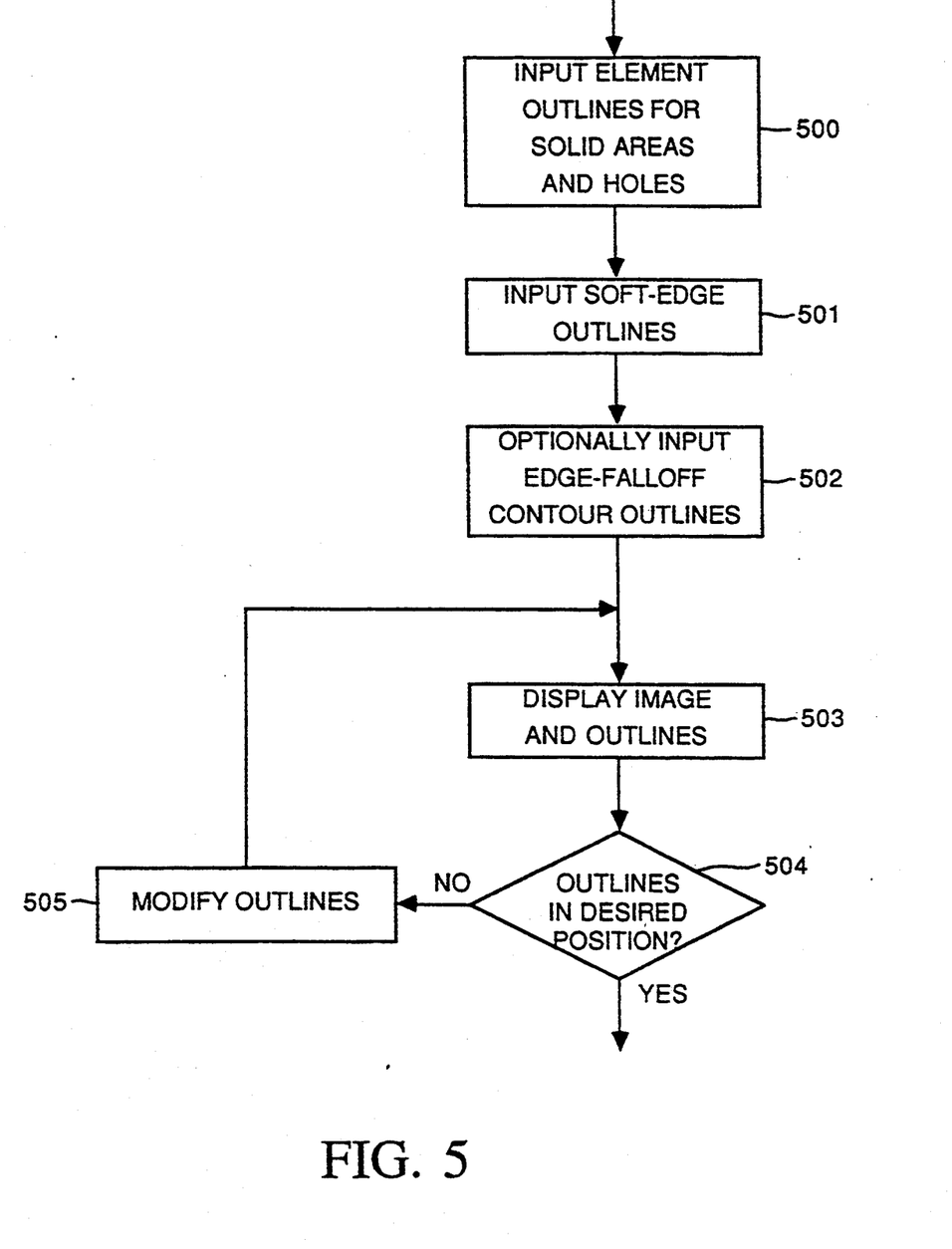
FIG. 5 is a flow diagram of the routine for inputting element outlines, including the technique of the present invention.

Referring now to FIG. 5 there is shown a flow diagram of the routine for inputting element outlines in step 306 of FIG. 3. The solid matte areas and holes are specified 500, and the soft-edge regions are specified 501 typically by the operator using an input device and a graphical display for visual registration with the subject image. However, alternate embodiments of the invention may use more automated methods such as conventional edge-detection image processing methods. In the preferred embodiment of the invention, the operator constructs the outlines by using the mouse or other input device to select certain control points around the visual display object or element, and a suitable routine well-known in the art is used to construct the outline from these control points, such as the method of cubic piece-wise polynomial splines. Also in the preferred embodiment of the invention, the same control point positions are used to contract both the inside (solid) and outside (soft-edge) outlines for typical hard-edge elements, and the operator indicates that a soft-edge matte is required by selecting a control point for one outline and moving the outlines apart to create the soft-edge area. Alternate embodiments can be employed. For example, one set of outline control points may be specified according to offsets from another set, or the number of inside and outside outline control points may differ, or an outline representation which does not use control points may be employed. An optional procedure 502 may be used in accordance with an embodiment of the invention in which additional falloff contours may be specified to adjust the characteristics of the soft-edge region. For example, a contour may be specified at which point the soft-edge value should be half-way between the solid area value and the value at the soft-edge extremities. In this manner, the degree of falloff of the soft-edge may be adjusted in accordance with various visual elements. Step 503 represents the procedure for displaying the image together with the matte regions. In a typical embodiment of the invention, the foreground element image is displayed and then outlines of the solid matte regions and soft-edge regions are drawn over in registration with the image such that both are made visible according to various conventional display schemes. Decision 504 determines whether the outlines are in the desired position, and typically this is determined by inspection by the operator using the graphics display, although alternative embodiments of the invention may employ more automated conventional image analysis methods. If the outlines are not in their desired positions, the routine proceeds to modify the outlines 505, and then back to step 503. If the outlines are in their desired positions, the routine proceeds to decision 307 of FIG. 3.

Figure 6:
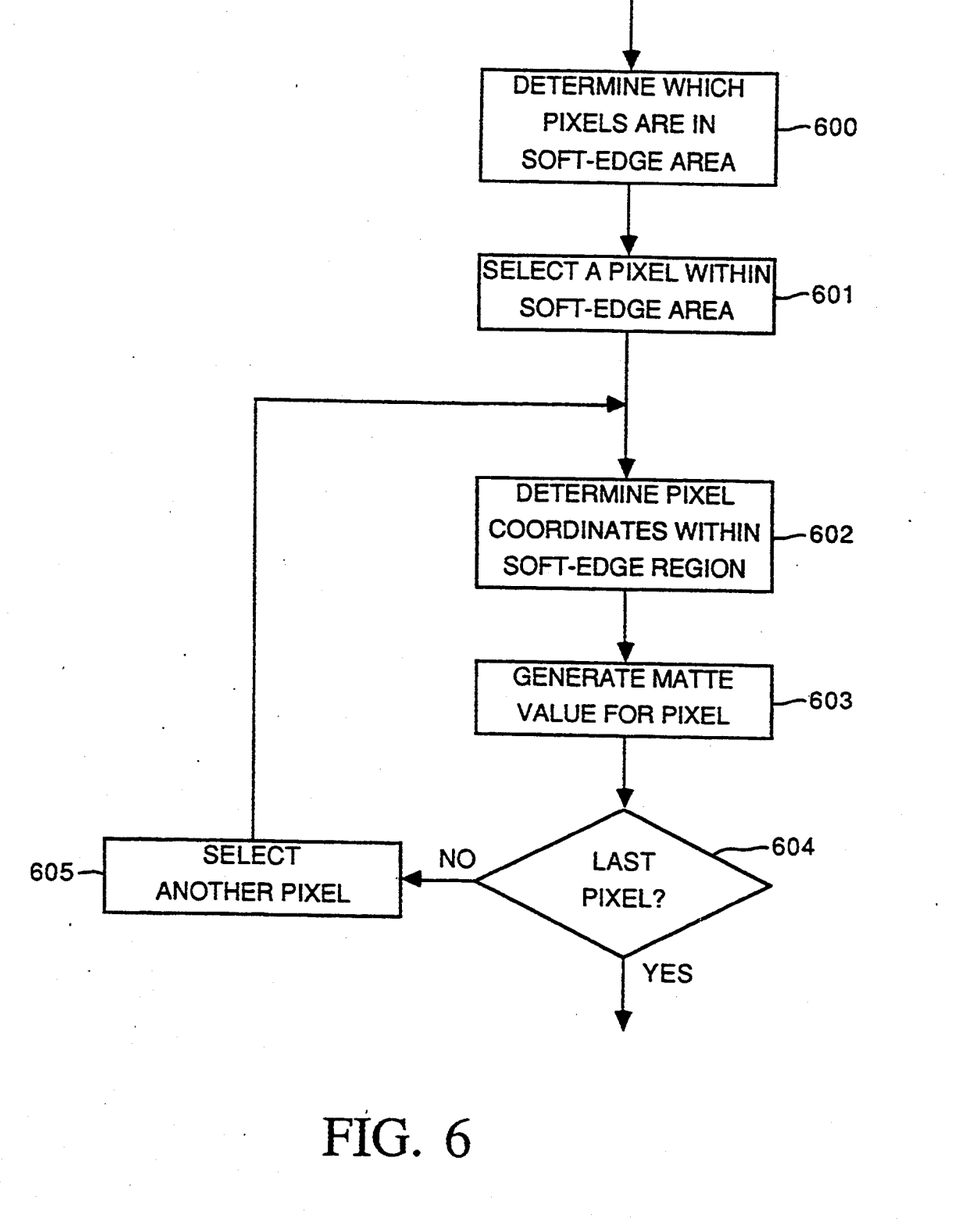
FIG. 6 is a flow diagram of the routine for generating soft-edge mattes from their outlines.

Referring now to FIG. 6 there is shown a flow diagram of the routine for generating soft-edge mattes from their outlines, depending upon the order in which the pixels in the soft-edge are selected. The step 600 represents the procedure by which the pixels in the soft-edge region are determined. Step 601 represents the selection of a pixel within the soft-edge region for filling. The relative location of the pixel is determined 602 with respect to the solid and soft-edge boundaries, as employed in a typical embodiment of the invention and described in more detail below. The matte value for this pixel is computed 603, as described in more detail below for a typical embodiment of the invention. Decision 604 determines whether any more pixels in the soft-edge region remain to be processed, and if matte values for all pixels in the soft-edge region have not been computed, then the routine flows to step 605 for selecting another pixel from the soft-edge region, and then flows back to step 602. If all soft-edge pixels have been processed the routine flows to step 403 of FIG. 4 for output, or storage subsequently used.

Figure 7:
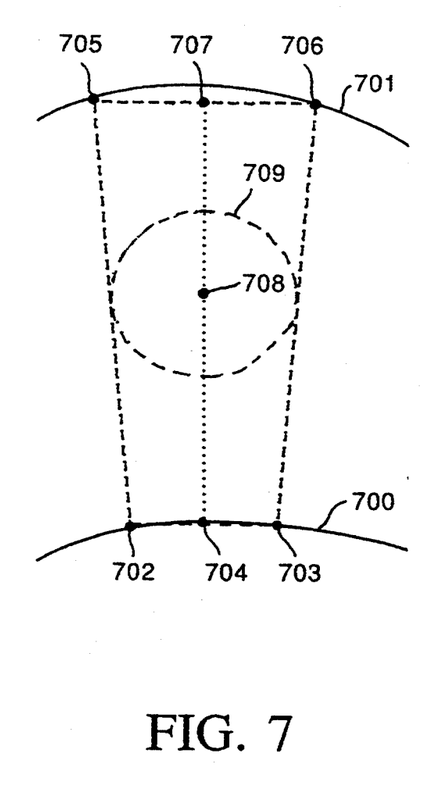
FIG. 7 shows one embodiment of a soft-area filling technique which can be employed in the method of the present invention.

Referring now to FIG. 7 there is shown an embodiment of a soft-area filling technique as can be employed in the procedure 402 of FIG. 4. For a point 702 on the solid matte boundary 700, a nearby point 703 is chosen also on the solid matte boundary and with a distance from point 702 of approximately one pixel. The point 704 is then computed as the midpoint of these two points, and may lie only approximately close to the solid matte boundary. Points 705 and 706 are computed to lie along the soft-edge boundary 701 and to have the same parametric distance from a reference point on their boundary as points 702 and 703 have along their boundary, respectively. The point 707 is then computed as the midpoint of points 705 and 706, and may lie only approximately close to the soft-edge matte boundary. A sequence of points along the line from 704 to 707 at a spacing of approximately one pixel in distance are computed and are represented by the typical point 708. Circle 709 represents the area within a small distance of point 708 contained by the lines joining points 702 and 705, and points 703 and 706, respectively. All pixels fully or partially contained by circle 709 are assigned a soft-area matte value according to a computation which may consider the distances to points 704 and 707, typically formulated to generate gradient values from opaque at point 704 to transparent at point 707. In accordance with alternative embodiments of the invention, optional soft-edge falloff contours, as specified in Step 502 of FIG. 5, may be used in the gradient calculation.

Figure 8:
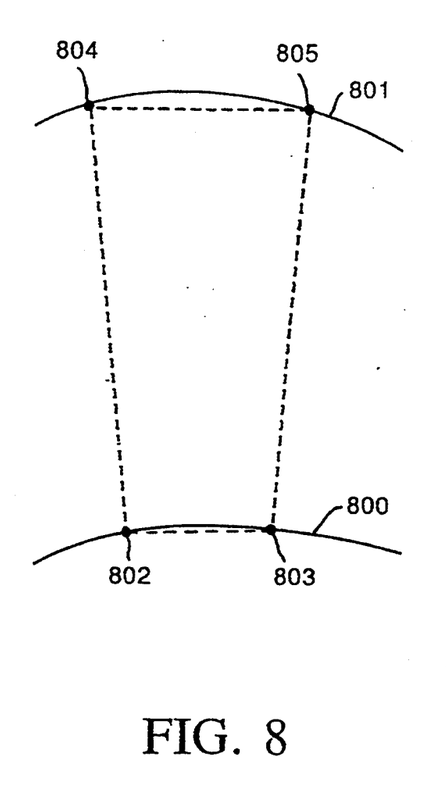
FIG. 8 shows an alternative embodiment of a soft-area filling technique which can be employed in the method of the present invention.

Referring now to FIG. 8 there is shown an alternative embodiment of a soft-area filling technique as can be employed in step 402 of FIG. 4. For a point 802 on the solid matte boundary 800, a nearby point 803 is chosen also on the solid matte boundary and with a distance from point 802 of approximately one pixel. Points 804 and 805 are computed to lie along the soft-edge boundary 801 and to have the same parametric distances from a reference point on their boundary as points 802 and 803 have along their boundary, respectively. The quadrilateral thus formed by these four points is then rendered as an approximation to the actual soft-edge region bounded by these points using a conventional gradient polygon fill method known in the art.

Figure 9A:
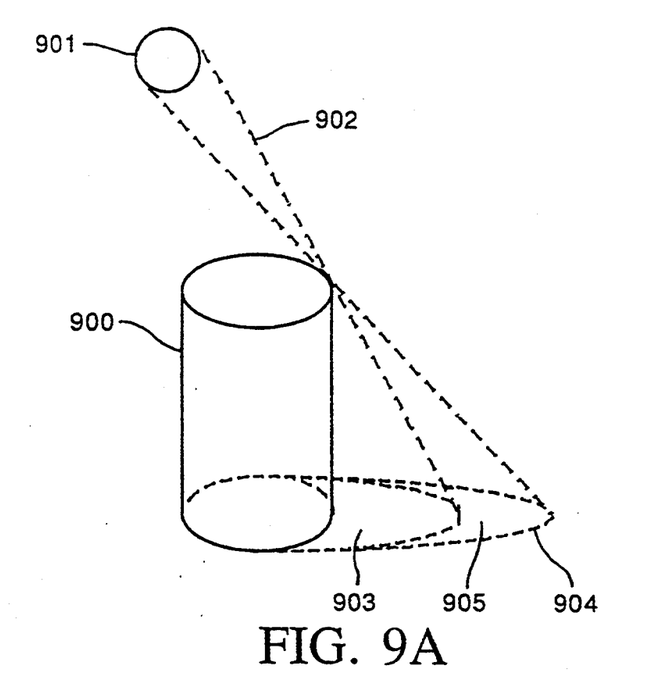
FIGS. 9A, 9B, 9C are diagrams illustration examples of the use of the present invention to generate a soft-edge matte for an object and its shadow penumbra.
Figure 9B:
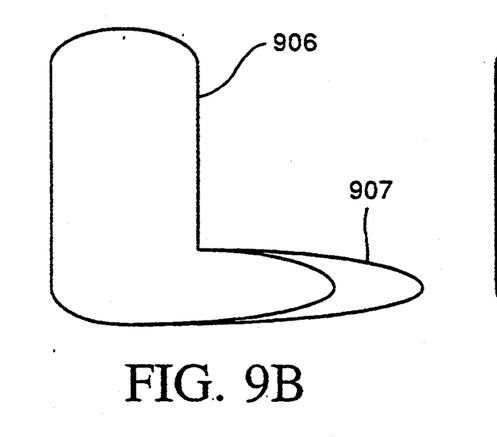
Figure 9C:
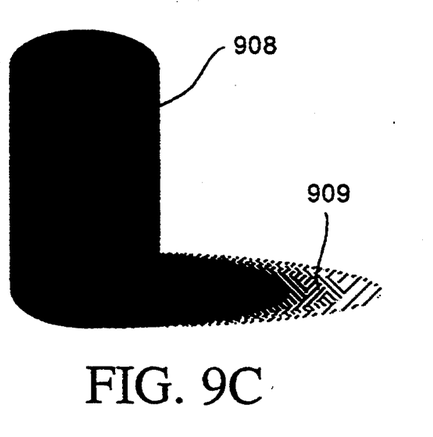

Referring now to FIGS. 9A–9C, there are shown diagrams illustrating an example of the use of the invention to generate a soft-edge matte for an image of an object and its shadow penumbra. Object 900 is illuminated by area light source 901. Light rays 902 cast a shadow 903 upon a surface. Partial obscuring of the area of the light 901 by the object 900 results in soft-edge shadow penumbra 905 which eventually fades away at extremity 904. The method of the current invention is employed to generate solid matte outline 906 and soft-edge matte outline 907, as shown in FIG. 9B. These regions are then filled in accordance with an embodiment of the invention to produce the soft-edge matte with solid area 908 and soft area 909, as shown in FIG. 9C. This matte can then be subsequently used to extract the object element and its soft-edge shadow for compositing and other effects.

Figure 10A:
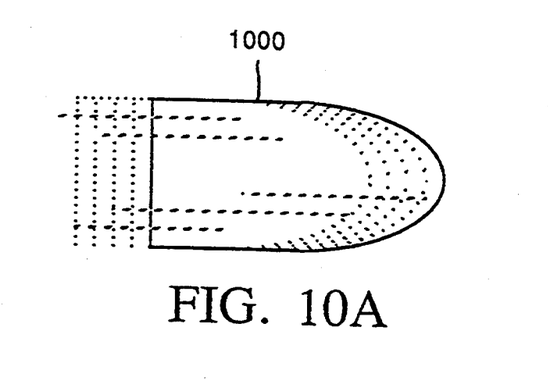
FIGS. 10A-10C are diagrams illustrating examples of the use of the present invention to generate a soft-edge matte for a motion blurred object.
Figure 10B:
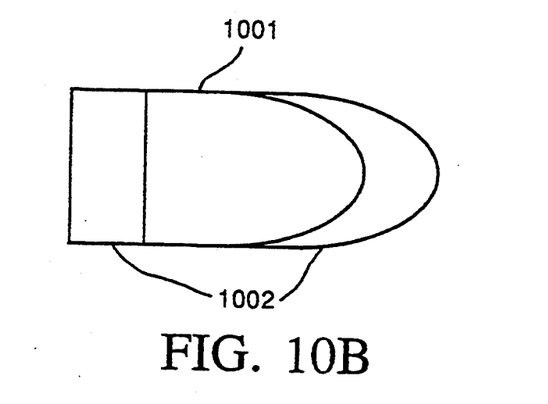
Figure 10C:
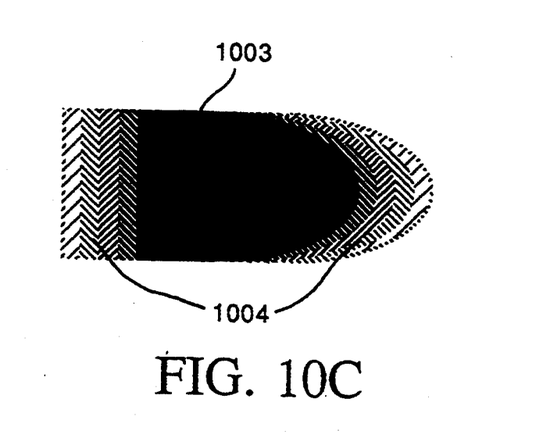

Referring now to FIGS. 10A–10C, there are shown diagrams illustrating an example of the use of the invention to generate a soft-edge matte for the display image of a motion-blurred object 1000. An image of a speeding bullet 1000 can exhibit blurriness as a result of its movement during the image recording process. The method of the current invention is employed to generate the solid matte outline 1001 and the soft-edge matte outline 1002. These regions are then filled in accordance with an embodiment of the invention to produce the soft-edge matte with solid area 1003 and soft area 1004. This matte can then be subsequently used to extract the blurred object element for compositing and other effects.

The method of the present invention may also be employed in connection with image processing techniques other than mattes, in order to generate soft edges for such techniques. For example, when performing an image-processing operation, such as tinting, to a visual element of an image, the method of the present invention may be used to achieve soft edges for the elements. Thus, if the element is a blurred object, tinting will be applied at lesser intensity at the soft-edge boundaries in accordance with the techniques described above.

It is expected that various other effects may be applied in conjunction with the soft-edge techniques of the present invention.

I claim:

1. In an image comprising a plurality of regions, including a first region including a visual element, a second region adjacent to the first region, and a third region adjacent to the second region, the second region disposed between the first and third regions, selected portions of the regions having a continuous luminance transition therebetween, a method for generating a soft-edge matte in the second region for the visual element in the first region, comprising the steps of:

(a) specifying an inner outline to define an inner region of the image having a plurality of pixels, the inner region corresponding to the first region;

(b) specifying a soft-edge outline to define a soft-edge region of the image having a plurality of pixels, the soft-edge region including an area of the image between the inner outline and the soft-edge outline, the soft-edge region corresponding to the second region;

(c) establishing representative values for the pixels of the inner region; and (d) establishing representative values for the pixels of the soft-edge region.

2. A method for generating soft-edge mattes for a visual element of an image according to claim 1, further comprising the step of storing representations of the specified inner and soft-edge outlines in a database.

3. The method of claim 1, further comprising the step of displaying the inner outline and the soft-edge outline using distinguishing visual attributes.

4. The method of claim of claim 3, wherein the displaying step comprises the substeps of:
displaying the inner outline using a first color; and
displaying the soft-edge outline using a second color.

5. The method of claim 1, wherein step (d) includes establishing a succession of varying representative values forming a gradient for the pixels of the soft-edge region.

6. The method of claim 5, wherein step (d) comprises, for each pixel within the soft-edge region:

(d.1) determining the relative location of the pixel with respect to the inner outline and the soft-edge outline; and (d.2) responsive to the results of step (d.1), generating a representative value for the pixel.

7. The method of claim 6, wherein step (d.2) comprises:

(d.2.1) selecting a first point on the inner outline;

(d.2.2) selecting a second point on the inner outline, the second point being located at a distance of approximately one pixel width away from the first point;

(d.2.3) determining a midpoint between the first and second points;

(d.2.4) determining a third point and a fourth point, the third and fourth points lying along the soft-edge outline, the third point having a parametric distance from a reference point on the soft-edge outline that is substantially equal to the parametric distance of the first point from a corresponding reference point on the inner outline, and the fourth point having a parametric distance from the reference point that is substantially equal to the parametric distance of the second point from the corresponding reference point;

(d.2.5) determining a midpoint between the third and fourth points;

(d.2.6) determining a plurality of points, the points being spaced at a distance of approximately one pixel width and lying along a line from the midpoint between the first and second points to the midpoint between the third and fourth points; and (d.2.7) determining a representative value for all pixels fully or partially contained in a circular area within a small distance of each of said points.

8. The method of claim 5, wherein step (d) comprises:

(d.1) selecting a first point on the inner outline;

(d.2) selecting a second point on the inner outline, the second point being located at a distance of approximately one pixel width from the first point;

(d.3) determining a third point and a fourth point, the third and fourth points each lying on the soft-edge outline, the third point having a parametric distance from a reference point on the soft-edge outline that is substantially equal to the parametric distance of the first point from a corresponding reference point on the inner outline, and the fourth point having a parametric distance from the reference point that is substantially equal to the parametric distance of the second point from the corresponding reference point;

(d.4) establishing representative values for the pixels lying within a quadrilateral formed by the first, second, third and fourth points in accordance with gradient polygon fill logic; and (d.5) repeating steps (d.1) to (d.4) until all representative values for the pixels in the soft-edge region are established.

9. The method of claim 1, wherein the specifying of the inner outline and the soft-edge outline of steps (a) and (b) are manually performed.

10. The method of claim 1, wherein step (a) comprises:

(a.1) specifying a first set of control points around the visual element; and (a.2) constructing the inner outline based on the first set of control points;

and wherein step (b) comprises:

(b.1) specifying a second set of control points around the visual element; and (b.2) constructing the soft-edge outline based on the second set of control points.

11. The method of claim 10, wherein:
step (a.2) comprises determining the inner outline based on the first set of control points using cubic piece-wise polynomial splines; and
step (b.2) comprises determining the soft-edge outline based on the second set of control points using cubic piece-wise polynomial splines.

12. The method of claim 1, wherein step (a) comprises:

(a.1) specifying a set of control points around the visual element; and (a.2) constructing the inner outline based on the set of control points;

(b.1) constructing the soft-edge outline based on the set of control points;

(b.2) selecting at least one of the control points; and (b.3) moving the selected control point to alter the soft-edge outline without changing the inner outline.

13. The method of claim 1, further comprising the step, before performing step (d), of adjusting the characteristics of the soft-edge region.

14. The method of claim 13, wherein the adjusting step comprises specifying falloff contours within the soft-edge region.

15. A method for generating a soft-edge matte for a visual element of a moving image, comprising the steps of:

(a) defining at least two keyframes separated by a plurality of in-between frames;

(b) for each keyframe:

(b.1) specifying a keyframe inner outline to define a keyframe inner region having a plurality of pixels;

(b.2) specifying a keyframe soft-edge outline to define a keyframe soft-edge region having a plurality of pixels, the keyframe soft-edge region including an area between the keyframe inner outline and the keyframe soft-edge outline;

(b.3) establishing representative values for the pixels of the keyframe inner region; and (b.4) establishing representative values for the pixels of the keyframe soft-edge region;

(c) for each in-between frame:

(c.1) interpolating an inner outline for the in-between frame from the keyframe inner outlines to define an inner region for the in-between frame, the inner region for the in-between frame having a plurality of pixels;

(c.2) interpolating a soft-edge outline for the in-between frame from the keyframe soft-edge outlines to define a soft-edge region for the in-between frame, the soft-edge region for the in-between frame having a plurality of pixels and including an area between the inner outline for the in-between frame and the soft-edge outline for the in-between frame;

(c.3) establishing representative values for the pixels of the inner region for the in-between frame; and (c.4) establishing representative values for the pixels of the soft-edge region for the in-between frame.

16. The method of claim 15, wherein each of steps (c.1) and (c.2) is performed using cubic piece-wise polynomial spline interpolation.

17. The method of claim 15, further comprising:

(d) storing representations of the specified keyframe inner and soft-edge outlines in a database; and (e) storing representations of the interpolated inner and soft-edge outlines for the in-between frames in a database.

18. In an image comprising a plurality of regions, including a first region including a visual element, a second region adjacent to the first region, and a third region adjacent to the second region, the second region disposed between the first and third regions, selected portions of the regions having a continuous luminance transition therebetween, a method for generating a soft-edge boundary between the second and third regions for an image-processing operation, comprising the steps of:

(a) specifying an inner outline to define an inner region having a plurality of pixels, the inner region corresponding to the first region;

(b) specifying a soft-edge outline to define a soft-edge region having a plurality of pixels, the soft-edge region including an area between the inner outline and the soft-edge outline, the soft-edge region corresponding to the second region;

(c) establishing representative values for the pixels of the inner region using the image processing operation; and (d) establishing representative values for the pixels of the soft-edge region using the image processing operation.

19. In an image comprising a plurality of regions, including a first region including a visual element, a second region adjacent to the first region, and a third region adjacent to the second region, the second region disposed between the first and third regions, selected portions of the regions having a continuous luminance transition therebetween, an apparatus for generating a soft-edge matte for the visual element in the first region, comprising:

an input device, for accepting input specifying an inner outline to define an inner region of the image having a plurality of pixels, the inner region corresponding to the first region, and for accepting input specifying a soft-edge outline to define a soft-edge region of the image having a plurality of pixels, the soft-edge region including an area of the image between the inner outline and the soft-edge outline, and corresponding to the second region;

means coupled to the input device for establishing representative values for the pixels of the inner region;

means coupled to the input device for establishing representative values for the pixels of the soft-edge region; and a display device coupled to the input device for displaying the inner outline, the soft-edge outline, and the soft-edge region.

20. The apparatus of claim 19, further comprising a database storage device, coupled to the input device, for storing representations of the specified inner and soft-edge outlines in a database.

21. An apparatus for generating a soft-edge matte for a visual element of a moving image, comprising:

keyframe definition means for defining at least two keyframes separated by a plurality of in-between frames;

an input device, coupled to the keyframe-definition means, for specifying for each keyframe a keyframe inner outline to define a keyframe inner region having a plurality of pixels, and for specifying a keyframe soft-edge outline to define a keyframe soft-edge region having a plurality of pixels, the keyframe soft-edge region including an area between the keyframe inner outline and the keyframe soft-edge outline;

means coupled to the input device for establishing representative values for the pixels of the inner region for each keyframe;

means coupled to the input device for establishing representative values for the pixels of the soft-edge region for each keyframe;

inner outline interpolating means, coupled to the input device, for interpolating for each in-between frame an inner outline for the in-between frame from the keyframe inner outlines to define an inner region for the in-between frame, the inner region for the in-between frame having a plurality of pixels;

soft-edge outline interpolating means, coupled to the input device, for interpolating for each in-between frame a soft-edge outline for the in-between frame from the keyframe soft-edge outlines to define a soft-edge region for the in-between frame, the soft-edge region for the in-between frame having a plurality of pixels and including an area between the inner outline for the in-between frame and the soft-edge outline for the in-between frame;

means coupled to the input device for establishing representative values for the pixels of the inner region for each in-between frame; and means coupled to the input device, for establishing representative values for the pixels of the soft-edge region for each in-between frame.

22. The apparatus of claim 21, further comprising a database storage device, coupled to the input device and to the interpolating means, for storing representations of the specified inner and soft-edge outlines for each keyframe and each in-between frame.

* * * * *